United States Patent
Lam

(10) Patent No.: US 10,667,606 B2
(45) Date of Patent: Jun. 2, 2020

(54) ANTI-VIBRATION DEVICE FOR AN ACOUSTIC DEVICE AND AN AUDIO EQUIPMENT FRAME HAVING AN ANTI-VIBRATION DEVICE

(71) Applicant: B Lam Limited, Kwai Chung, N.T. (HK)

(72) Inventor: Wai Ming Lam, Hong Kong (HK)

(73) Assignee: B LAM LIMITED, Hong Kong (HK)

( * ) Notice: Subject to any disclaimer, the term of this patent is extended or adjusted under 35 U.S.C. 154(b) by 0 days.

(21) Appl. No.: 15/835,051

(22) Filed: Dec. 7, 2017

(65) Prior Publication Data

US 2018/0160804 A1 Jun. 14, 2018

(30) Foreign Application Priority Data

Dec. 8, 2016 (CN) .......................... 2016 1 1127617

(51) Int. Cl.
*A47B 81/06* (2006.01)
*F16F 15/04* (2006.01)
(Continued)

(52) U.S. Cl.
CPC .............. *A47B 81/06* (2013.01); *A47B 97/00* (2013.01); *F16F 15/04* (2013.01); *G11B 33/08* (2013.01);
(Continued)

(58) Field of Classification Search
CPC . A47B 81/06; A47B 7/00; A47B 97/00; F16F 15/04; F16F 15/046; F16F 15/08;
(Continued)

(56) References Cited

U.S. PATENT DOCUMENTS 2,357,740 A * 9/1944 Hickin ................ F16F 1/424
267/141.1
2,502,717 A 4/1950 Gusdorf et al.
(Continued)

FOREIGN PATENT DOCUMENTS

CN 2330129 Y 7/1999
CN 1671247 A 9/2005
(Continued)

OTHER PUBLICATIONS

Vibration Reduction Ability of Polymers, Particularly Polymethylmethacrylate and Polytetrafluoroethylene; Wenhai Fu et al.; 2001 (Year: 2001).*
(Continued)

*Primary Examiner* — Ingrid M Weinhold
(74) *Attorney, Agent, or Firm* — Day Pitney LLP

(57) ABSTRACT

An anti-vibration device for sound equipment includes an elastic stress frame, the elastic stress frame including a stress deformation portion and a plurality of support portions, the support portions protruding toward one side with respect to the stress deformation portion. The anti-vibration device prevents most resonance from intruding into the sound equipment, the elastic stress frame and the laminate plate for supporting the sound equipment, and the sound equipment can work stably without being influenced by sound waves and resonance, so as to achieve its own due performance, naturally reducing the distortion rate of outputted sound.

4 Claims, 8 Drawing Sheets

(51) Int. Cl.
*G11B 33/08* (2006.01)
*A47B 97/00* (2006.01)
*H05K 7/14* (2006.01)
*H05K 7/18* (2006.01)
*H04R 1/02* (2006.01)

(52) U.S. Cl.
CPC ............ *H05K 7/14* (2013.01); *H05K 7/183* (2013.01); *H04R 1/026* (2013.01)

(58) Field of Classification Search
CPC .......... G11B 33/08; H04R 1/026; H05K 7/14; H05K 7/183
USPC ............. 267/152, 153, 141.1, 141, 292; 248/346.01, 346.02, 603, 633, 638, 560, 248/636, 568, 615, 618; 181/284
See application file for complete search history.

(56) References Cited

U.S. PATENT DOCUMENTS

| | | | | |
|---|---|---|---|---|
| 2,729,443 | A * | 1/1956 | Olinger | F16F 1/406 |
| | | | | 267/141 |
| 2,893,665 | A * | 7/1959 | Paulsen | F16F 1/3713 |
| | | | | 248/362 |
| 3,003,738 | A * | 10/1961 | Horovitz | F16F 1/422 |
| | | | | 267/141.1 |
| 3,831,923 | A * | 8/1974 | Meldrum | F16F 1/422 |
| | | | | 267/141 |
| 4,269,400 | A * | 5/1981 | Jensen | F16F 1/025 |
| | | | | 188/268 |
| 4,433,834 | A * | 2/1984 | Jwuc | B60G 11/22 |
| | | | | 267/141.1 |
| 4,560,136 | A * | 12/1985 | Basore | G11B 33/08 |
| | | | | 248/559 |
| 4,572,471 | A * | 2/1986 | Schrepfer | F16F 15/073 |
| | | | | 248/560 |
| 4,705,257 | A * | 11/1987 | Leo | F16F 7/00 |
| | | | | 248/201 |
| 5,197,707 | A * | 3/1993 | Kohan | F16F 7/01 |
| | | | | 248/562 |
| 5,289,348 | A | 2/1994 | Miller | |
| 5,927,669 | A * | 7/1999 | Sassman | A47B 81/06 |
| | | | | 248/205.2 |
| 6,251,493 | B1 * | 6/2001 | Johnson | F16F 1/37 |
| | | | | 428/220 |
| 6,357,717 | B1 * | 3/2002 | Kennard, IV | F16F 1/44 |
| | | | | 248/562 |
| 6,590,989 | B2 | 7/2003 | Chen | |
| 6,655,668 | B1 | 12/2003 | Wakeen et al. | |
| 7,770,693 | B2 * | 8/2010 | Uejima | F16F 1/3737 |
| | | | | 181/207 |
| 9,677,636 | B2 * | 6/2017 | Nakamura | C10M 143/02 |
| 9,788,446 | B1 * | 10/2017 | Townsend | H05K 7/06 |
| 9,879,415 | B2 * | 1/2018 | Hooker | E04B 1/36 |
| 2002/0162937 | A1 * | 11/2002 | Sebert | H04R 1/026 |
| | | | | 248/618 |
| 2006/0006307 | A1 | 1/2006 | Mogilever | |
| 2007/0075469 | A1 * | 4/2007 | Yamazaki | F16F 9/103 |
| | | | | 267/140.11 |
| 2014/0054439 | A1 * | 2/2014 | Liu | H05K 7/1497 |
| | | | | 248/568 |
| 2017/0328442 | A1 * | 11/2017 | Gilbert | F16F 3/08 |

FOREIGN PATENT DOCUMENTS

| | | |
|---|---|---|
| CN | 104517623 A | 4/2015 |
| EP | 0928124 A2 | 7/1999 |
| GB | 2474850 A | 5/2011 |
| JP | S 5919739 A | 2/1984 |
| JP | H 09226473 A | 9/1997 |

OTHER PUBLICATIONS

SIPO's International Search Report, issued in corresponding short-term Hong Kong patent application No. 20161112761.5, dated Feb. 24, 2017. (Translation Unavailable).

European Search Report and Written Opinion, issued in corresponding EP application No. 17206156, dated May 4, 2018.

* cited by examiner

ANTI-VIBRATION DEVICE FOR AN ACOUSTIC DEVICE AND AN AUDIO EQUIPMENT FRAME HAVING AN ANTI-VIBRATION DEVICE

TECHNICAL FIELD

The present invention relates to an anti-vibration device for sound equipment and a sound equipment rack with an anti-vibration device, and in particular, to an anti-vibration device which is used for reducing the consonance and resonance of sound equipment and of a laminate plate supporting the sound equipment and which has an elastic stress frame, and a sound equipment rack with an anti-vibration device.

BACKGROUND

The case of sound equipment and the laminate plate supporting the sound equipment have similar characters with a musical instrument room, and when the sound equipment and the laminate plate supporting the sound equipment are played, struck or subjected to sound waves, vibrations, etc., they generate different levels of consonance and resonance under different conditions. Under the influence of the consonance and resonance, the sound equipment and the laminate plate supporting the sound equipment will no longer maintain their original static, quiet and stable normal working state, and will generate consonance and resonance, so that the sound equipment will output a distorted sound.

Conventionally, feet and pads for supporting the sound equipment are made of a hard material, and when they are used to support the sound equipment, since the contact area between the foundations and pads and the sound equipment is large, they cannot prevent the consonance and resonance from influencing the sound equipment. When vibration comes, the sound equipment will generate resonance and consonance and output a sound distorted greatly.

SUMMARY

The present invention provides for an anti-vibration device which is used for reducing consonance and resonance and has an elastic stress frame, and a sound equipment rack with an anti-vibration device. By applying the elastic stress frame to the case of a sound equipment and/or the laminate plate supporting the sound equipment in advance, which is similar to applying a suitable stress at the center of the cavity, the stable internal stress thereof is utilized to allow the case of the sound equipment and/or the laminate plate supporting the sound equipment to maintain their original position and state as much as possible, so that they cannot generate consonance and resonance, reducing the degree of distortion of the sound equipment.

The elastic stress frame produces a long-term stable internal stress in the following two ways. The first one is that the sound equipment is applied to the elastic stress frame, and produces, with its own weight, downward pressure on the elastic stress frame, so that the elastic stress frame is deformed and produces a long-term stable internal stress. The second one is that the elastic stress frame is mechanically locked, by means of screw fastening, onto the outside of the sound equipment to apply threaded fastening pressure on the sound equipment, so that the elastic stress frame is deformed and produces a long-term stable internal stress.

This results in high requirements for the material that makes the elastic stress frame. Firstly, the material used to make the elastic stress frame should have sufficient strength to support the weight of the sound equipment itself. Secondly, the material used to make the elastic stress frame should have proper elasticity to produce certain elastic deformation when applied to the sound equipment.

The present invention provides for an anti-vibration device for sound equipment, the anti-vibration device comprising an elastic stress frame, the elastic stress frame having a stress deformation portion and a plurality of support portions, the support portions protruding toward one side with respect to the stress deformation portion.

Additionally, the elastic stress frame has a solid triangular shape, a Y-shaped star shape, a hollow triangular shape or a four-legged bridge shape.

Additionally, the support portions are located at radially outer end portions that form the shape of the elastic stress frame, the stress deformation portion being formed by connection portions between the support portions.

Additionally, the elastic stress frame has a linear strip shape, the support portions being located at both ends that form the linear strip shape of the elastic stress frame.

Additionally, the support portions have, on a lower end thereof, contact lines for support, the contact lines being inclined or perpendicular with respect to the extending direction of the linear strip shape of the elastic stress frame.

Additionally, the elastic stress frame has an arcuate shape, two ends of the arcuate shape of the elastic stress frame form the support portions, and the ends of the support portions have inwardly extending hook portions, the stress deformation portion and the inwardly extending hook portions of the support portions defining therebetween a holding space for holding the sound equipment.

Additionally, the hook portion has a protrusion portion extending toward the stress deformation portion.

Additionally, the stress deformation portion has a protrusion portion thereon, the extending direction of the protrusion portion on the stress deformation portion being opposite to the extending direction of the support portions.

Additionally, the material of the elastic stress frame may be one selected from polymethylmethacrylate, polyacrylic acid, polyacrylate, polycarbonate, polystyrene, PE, PP, PET, PBT and ABS.

The present invention further provides for an anti-vibration device for sound equipment, the anti-vibration device is a combined structure of a plurality of elastic stress frames which at least comprise a first elastic stress frame and a second elastic stress frame, the first and second elastic stress frames each having a stress deformation portion and support portions, the stress deformation portions of the first elastic stress frame being connected to the second elastic stress frame.

Additionally, the stress deformation portions of the first elastic stress frame are located on the side where the support portions of the second elastic stress frame are located, the extending direction of the support portions of the first elastic stress frame coinciding with as the extending direction of the support portions of the second elastic stress frame.

Additionally, the stress deformation portion of the first elastic stress frame is connected to the stress deformation portion of the second elastic stress frame.

Additionally, the first elastic stress frame has at least two support portions distributed along a circumferential direction.

Additionally, the ends of support portions of the second elastic stress frame have inwardly extending hook portions, the support portions of the first elastic stress frame and the inwardly extending hook portions on the ends of the support portions of the second elastic stress frame defining therebetween a holding space for holding the sound equipment.

Additionally, the stress deformation portion of the first elastic stress frame is connected to the end of the support portions of the second elastic stress frame away from the stress deformation portion of the second elastic stress frame, and a support surface for supporting the sound equipment is formed on the stress deformation portion of the second elastic stress frame.

Additionally, the first elastic stress frame has a solid triangular shape, a Y-shaped star shape, a hollow triangular shape or a four-legged bridge shape.

Additionally, the first elastic stress frame has a linear strip shape, and the support portions of the first elastic stress frame is located at two ends that form the linear strip shape of the first elastic stress frame.

Additionally, the support portions of the first elastic stress frame have, on a lower end thereof, contact lines for support, the contact lines being inclined or perpendicular with respect to the extending direction of the linear strip shape of the first elastic stress frame.

Additionally, the materials of the first elastic stress frame and the second elastic stress frame are one or a combination of at least two selected from polymethylmethacrylate, polyacrylic acid, polyacrylate, polycarbonate, polystyrene, PE, PP, PET, PBT and ABS.

The present invention further provides for an anti-vibration device for sound equipment, the anti-vibration device is a combined structure of a plurality of elastic stress frames which at least comprise a first elastic stress frame and a second elastic stress frame, the first and second elastic stress frames each having a stress deformation portion and support portions, the support portions of the first elastic stress frame and the support portions of the second elastic stress frame protruding away from each other in opposite directions, the support portions on the second elastic stress frame and the support portions on the first elastic stress frame being arranged in an alternate manner along a circumferential direction.

Additionally, the first elastic stress frame has a ring shape, the number of the support portions of the first elastic stress frame is at least three, the at least three support portions of the first elastic stress frame being equidistantly distributed along the circumferential direction, and the stress deformation portion of the first elastic stress frame is formed by the arc-shaped ring segments between the support portions of the first elastic stress frame.

Additionally, the second elastic stress frame is located below the first elastic stress frame, the second elastic stress frame has a ring shape, the number of the support portions of the second elastic stress frame is at least three, the at least three support portions of the second elastic stress frame being equidistantly distributed along a circumferential direction, and the stress deformation portion of the second elastic stress frame is formed by the arc-shaped ring segments between the support portions of the second elastic stress frame.

Additionally, outer protrusions which have a width greater than the width of the ring and extend outward radially are provided at the positions where the stress deformation portion of the first elastic stress frame and the support portions of the first elastic stress frame are connected, and the support portions of the first elastic stress frame are provided on the outer protrusions.

Additionally, inner protrusions which have a width greater than the width of the ring and extend inward radially are provided at the positions where the stress deformation portion of the second elastic stress frame and the support portions of the second elastic stress frame are connected, and the support portions of the second elastic stress frame are provided on the inner protrusions.

Additionally, an intermediate position between two adjacent support portions on the stress deformation portion of the second elastic stress frame has an outwardly protruding shape corresponding to the outer protrusions on the stress deformation portion of the first elastic stress frame.

Additionally, an intermediate position between two adjacent support portions on the stress deformation portion of the first elastic stress frame has an inwardly protruding shape corresponding to the inner protrusions on the stress deformation portion of the second elastic stress frame.

Additionally, the first elastic stress frame has a Y-shaped star shape or a hollow triangular shape, the second elastic stress frame has a Y-shaped star shape or a hollow triangular shape.

Additionally, the materials of the first elastic stress frame and the second elastic stress frame may be one or a combination of at least two selected from polymethylmethacrylate, polyacrylic acid, polyacrylate, polycarbonate, polystyrene, PE, PP, PET, PBT and ABS.

The present invention further provides for a sound equipment rack with an anti-vibration device, the sound equipment rack comprising a rack body and an anti-vibration device, as described above, provided on the rack body.

The present invention further provides for a sound equipment rack, the rack body comprises a first upright column, a second upright column, a third upright column and a fourth upright column, the sound equipment rack comprising a first, second and third anti-vibration devices, the first and second anti-vibration devices being respectively the anti-vibration device comprising the elastic stress frame as described above and being respectively supported on the first upright column and the second upright column by means of cantilever beams, the third anti-vibration device being the anti-vibration device having a combined structure of a plurality of elastic stress frames as described above, the two support portions of the second elastic stress frame of the third anti-vibration device being respectively supported on the third upright column and the fourth upright column in a cantilevered manner, the first elastic stress frame of the third anti-vibration device being provided on the middle upper side of the stress deformation portion of the second elastic stress frame, the stress deformation portions of the elastic stress frames of the first and second anti-vibration devices and the stress deformation portion of the first elastic stress frame of the third anti-vibration device collectively forming a support surface for supporting the sound equipment.

Through the abovementioned arrangement, long-term stable internal stresses can be formed at all the interconnection points between the sound equipment, the elastic stress frame and the laminate plate for supporting the sound equipment due to the weight of the sound equipment itself and the return force of the elastic stress frame. Compared with the sound waves and resonance transmitted by the loudspeaker, these stresses have a stress strength far greater than the energy of the sound waves and resonance, so that most of the resonance cannot intrude into the sound equipment, the elastic stress frame and the laminate plate for supporting the sound equipment, whereby the output of the sound equipment is not affected by the external sound waves and resonance. At the time, the sound equipment can work stably without being influenced by sound waves and resonance, so as to achieve its own due performance, naturally reducing the distortion rate of outputted sound.

BRIEF DESCRIPTION OF THE DRAWINGS

The accompanying drawings, which form a part of the disclosure, are used to provide a further understanding of the present invention. In the drawings.

Wherein, the above drawings comprise the following reference signs: 10A-G—elastic stress frame; 11—stress deformation portion; 12—sound equipment foot; 13—support portion; 14—hollow triangular shape; 15—Y-shaped star shape with center reinforcing structure; 16—hook portion; 17—protrusion portion; 20A-F—first elastic stress frame; 21—stress deformation portion; 23—support portion; 25—connection bolt; 28—outwardingly protruding portion; 30A-F—second elastic stress frame; 31—stress deformation portion; 33—support portion; 36—hook portion; 38—inner protrusions; 40—sound equipment; 50—frame body; 51—first upright column; 52—second upright column; 53—third upright column; 54—fourth upright column.

DETAILED DESCRIPTION OF THE EMBODIMENTS

It should be noted that, in the case of no conflict, the embodiments disclosed herein and the features in the embodiments may be combined with each other. Aspects of the invention will be described in detail below with reference to the accompanying drawings and in combination with the embodiments.

Figure 1:
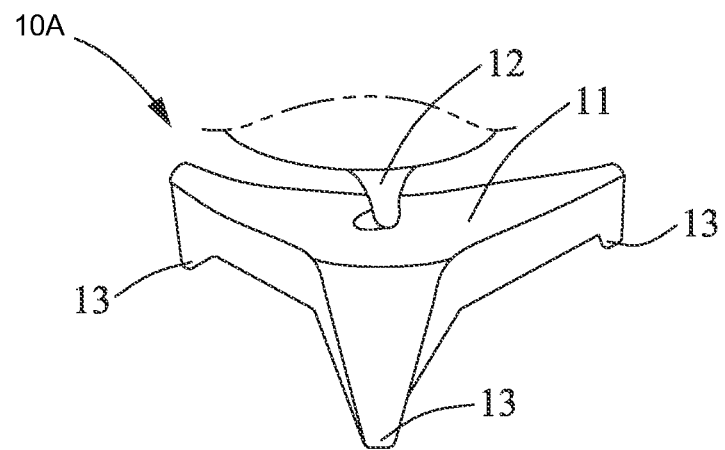
FIG. 1 shows a perspective view of a first embodiment of an anti-vibration device for sound equipment.

FIG. 1 is a perspective view of a first embodiment of an anti-vibration device for sound equipment. In FIG. 1, an anti-vibration device for sound equipment comprises an elastic stress frame 10A having a stress deformation portion 11 and three support portions 13 that protrude toward one side with respect to the stress deformation portion 11. In this embodiment, the elastic stress frame 10A has a solid triangular shape with support portions 13 in contact with the support surface at the radial outer end portions of each corner thereof, and the connection portions between the support portions form the stress deformation portion 11. The elastic stress frame 10A is provided between a foot 12 of the sound equipment and the support surface for supporting the sound equipment below. The weight of the sound equipment itself is pressed against the stress deformation portion 11 of the elastic stress frame 10A via the sound equipment foot 12, such that the stress deformation portion 11 is elastically deformed and produces a long-term stable internal stress. When the three support portions 13 come into contact with the support surface, the stress deformation portion 11 as a whole is suspended. In addition, the contact surface between the support portions 13 and the support surface is a spherical surface, and the contacts thereof are point contacts. The three point contacts between the three support portions 13 and the support surface enable the elastic stress frame 10A to be more stabilized. The material for manufacturing the elastic stress frame 10A has sufficient strength to meet the requirements of supporting the weight of the sound equipment itself and has appropriate elasticity so that when the sound equipment is applied to the elastic stress frame 10A, the stress deformation portion 11 of the elastic stress frame 10A will be elastically deformed to a certain degree. The material for manufacturing the elastic stress frame 10A is may be acrylic (also known as acrylic or plexiglass) and its chemical composition is polymethylmethacrylate (PMMA). Of course, other materials with similar properties, such as one selected from polyacrylic acid, polyacrylate, polycarbonate, polystyrene, PE, PP, PET, PBT and ABS, can also be used.

Figure 2:
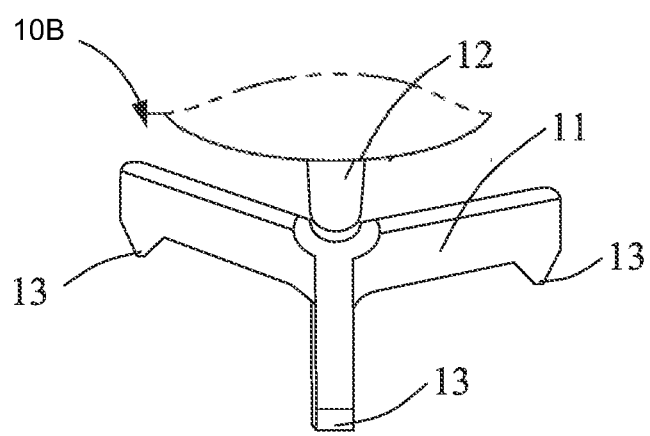
FIG. 2 shows a perspective view of a variant of the shape of the first embodiment.
Figure 3A:
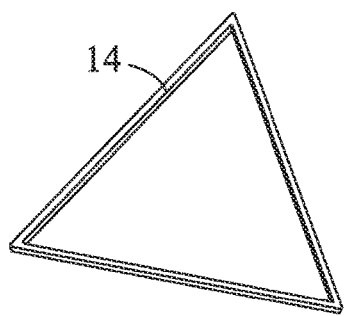
FIGS. 3A-J show top views of various variants of the shape of the first embodiment.
Figure 3B:
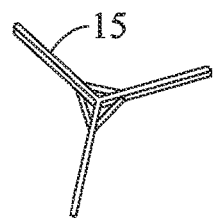
Figure 3C:
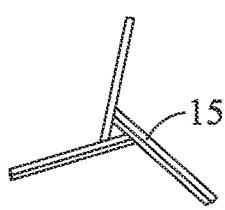
Figure 3D:
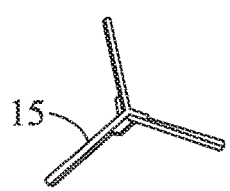
Figure 3E:
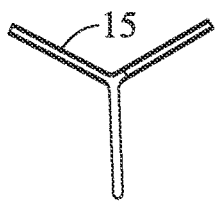
Figure 3F:
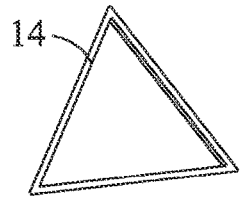
Figure 3G:
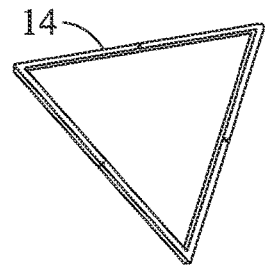
Figure 3H:
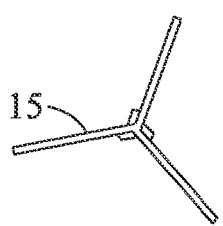
Figure 3I:
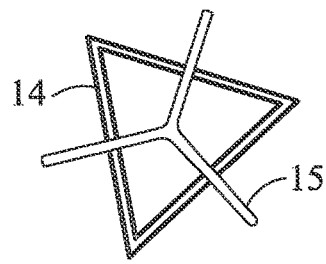
Figure 3J:

FIG. 2 is a perspective view of a variant of the shape of the first embodiment. In FIG. 2, the elastic stress frame 10B is a Y-shaped star shape having three strip-shaped structures that intersect at the center, equidistantly distributed along a circumferential direction and extend outwardly, support portions 13 protruding toward one side being formed on the radial outer end portions distant from the central point of intersection, the connecting strip-shaped structures between the support portions 13 forming a stress deformation portion 11. Compared with the solid triangular shape, the elastic stress frame 10B in the Y-shaped star shape has a lighter weight, has the advantages of material saving and lower manufacturing cost, and is suitable for supporting sound equipment having a lighter weight.

FIGS. 3A-J are top views of various variants of the shape of the first embodiment. In FIG. 3, the elastic stress frame comprises a hollow triangular shape 14, the three sides of the hollow triangle, form the stress deformation portion 11 of the elastic stress frame, and the triangular apexes at the connection of the three sides, i.e. the radial outer end portions of the hollow triangle form the support portions 13 protruding toward one side. This shape is suitable for forming a plane by three sides to support the sound equipment, and this support means enable the sound equipment to be more stabilized. In FIG. 3, there is further included a Y-shaped star shape 15 with a central reinforcing structure. This structure is based on the Y-shaped star shape, with reinforcing ribs being provided on the position between two adjacent outwardly extending strip-shaped structures close to the central interaction, and support portions 13 protruding toward one side being formed at radial outer end portions distal away from the central interaction, the connecting strip-shaped structures between the support portions and the reinforcing ribs thereof forming a stress deformation portion 11. By providing reinforcing ribs at central positions of the Y-shaped star shape, the disadvantage of insufficient strength caused by the thinner strip-shaped structure of the Y-shaped star shape is overcome, which is suitable for supporting sound equipment having a moderate weight.

Figure 4:
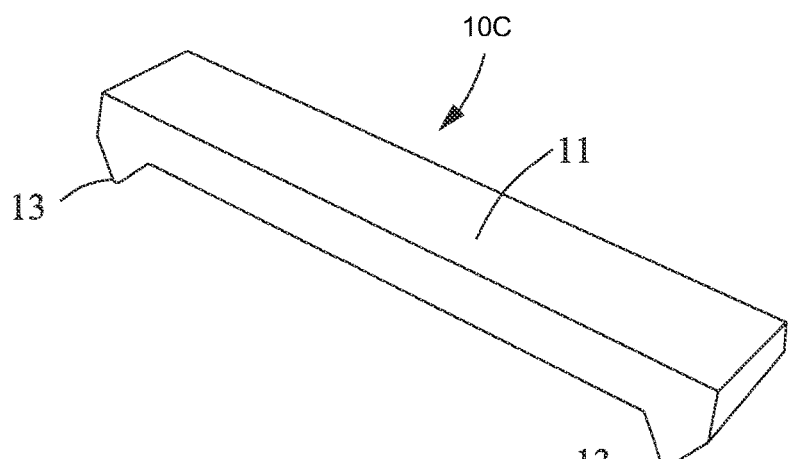
FIG. 4 shows a perspective view of a second structural variant of the first embodiment.

FIG. 4 is a perspective view of a second structural variant of the first embodiment. In FIG. 4, the elastic stress frame 10C has a linear strip shape. The elastic stress frame 10C comprises a stress deformation portion 11 and two support portions 13. The two support portions 13 protrude toward one side with respect to the stress deformation portion 11. In this embodiment, the support portions 13 are located at both ends of the linear strip shape constituting the elastic stress frame 10C for contact with the support surface, and the linear strip between two support portions 13 is the stress deformation portion 11. When the support portions 13 are in contact with the support surface, the stress deformation portion 11 as a whole is suspended. In addition, the support portions 13 have, at a lower end thereof, contact lines for support, and the contact lines are inclined or perpendicular with respect to the extending direction of the linear strip shape of the elastic stress frame 10C. The line contact between the two support portions 13 and the support surface enables the elastic stress frame 10C to be more stabilized.

Figure 5:
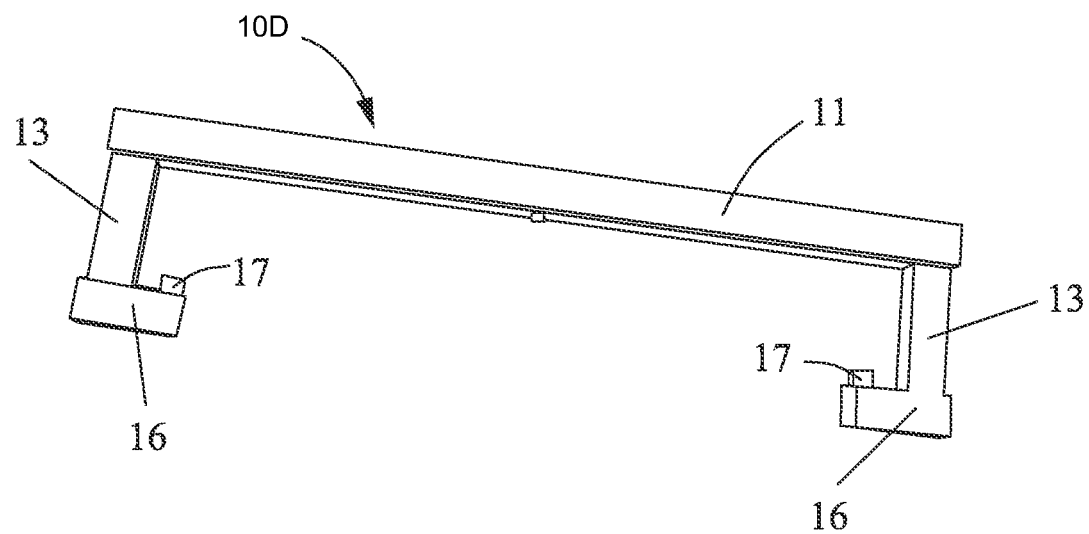
FIG. 5 shows a bottom perspective view of a third structural variant of the first embodiment.
Figure 6:
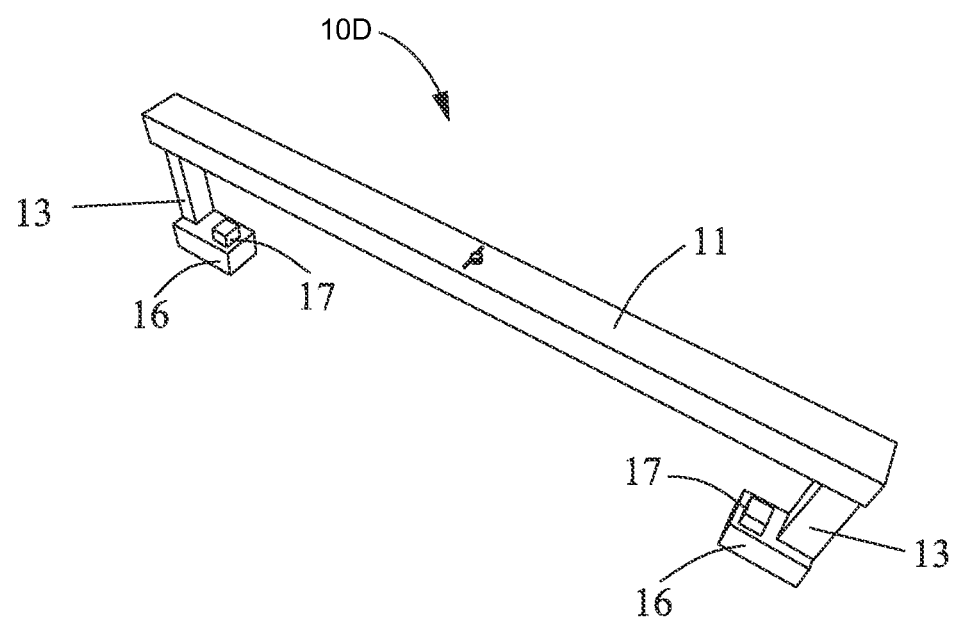
FIG. 6 shows a top perspective view of a third structural variant of the first embodiment.

FIG. 5 and FIG. 6 are bottom and top perspective views of a third structural variant of the first embodiment, respectively. In FIGS. 5 and 6, the elastic stress frame 10D has a body rod portion which is the stress deformation portion 11 having support portions 13 that come into contact with the sound equipment at both ends. The support portion 13 has an inwardly extending hook portion 16. A holding space for holding the sound equipment is defined between the stress deformation portion 11 of the elastic stress frame 10D and the inwardly extending hook portions 16 of the support portions 13, and the sound equipment is generally arranged in the holding space. In use, the elastic stress frame 10D is sleeved around the sound equipment, and the elastic stress frame 10D is fastened around the sound equipment by tightening a bolt (not shown) provided at a middle position of the stress deformation portion 11, thereby applying tightening pressure onto the sound equipment in the circumferential direction, so that the stress deformation portion 11 is deformed, resulting in a long-term and stable internal stress. In addition, a protrusion portion 17 extending toward the stress deformation portion 11 may also be provided on the hook portion 16. This arrangement may effectively reduce the contact area between the elastic stress frame 10D and the sound equipment at the support portions 13, thereby further enhancing the effects of vibration prevention and consonance and resonance reduction.

Figure 7:
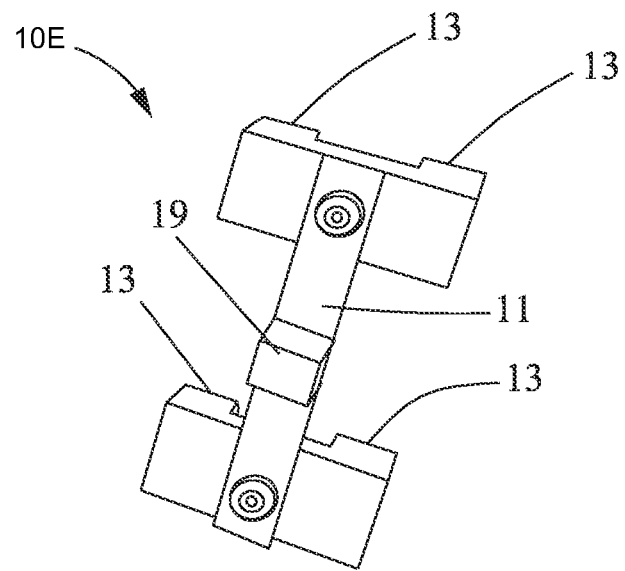
FIG. 7 shows a perspective view of a fourth structural variant of the first embodiment.

FIG. 7 is a perspective view of a fourth structural variant of the first embodiment. In FIG. 7, the elastic stress frame 10E has a four-legged bridge shape, and the elastic stress frame 10E of the four-legged bridge shape has a stress deformation portion 11 and four support portions 13. The support portions 13 protrude toward one side with respect to the stress deformation portion 11. The four support portions 13 are located on the four feet of the four-legged bridge shape, that is, located at the radial outer end portions of the elastic stress frame 10E of the four-legged bridge shape. The bridge shape between the four support portions 13 forms the stress deformation portion 11. Normally, a four-legged bridge-shaped elastic stress frame 10E is provided at a lower portion of the sound equipment for supporting the sound equipment from below. When the support portions 13 come in contact with the support surface, the stress deformation portion 11 as a whole is suspended, and the weight of the sound equipment itself is pressed against the stress deformation portion 11 so that the stress deformation portion 11 is deformed and produces a long-term stable internal stress.

In addition, a protrusion portion 19 may be provided on the stress deformation portion 11, and the extending direction of the protrusion portion 19 on the stress deformation portion 11 is with respect to the extending direction of the support portions 13. This arrangement may effectively reduce the contact area between the elastic stress frame 10E and the sound equipment on the stress deformable portion 11, thereby further enhancing the effects of vibration prevention and consonance and resonance reduction.

Figure 8:
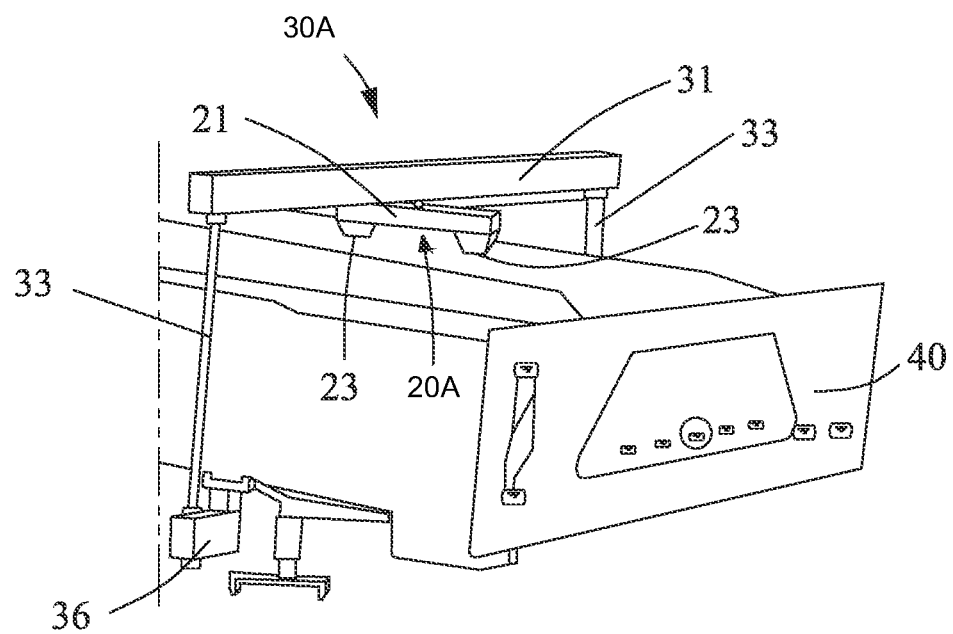
FIG. 8 shows a perspective view of a second embodiment of an anti-vibration device for sound equipment in use.

FIG. 8 is a perspective view of a second embodiment of an anti-vibration device for sound equipment in use. In FIG. 8, the anti-vibration device for sound equipment 40 is a combined structure of a plurality of elastic stress frames, at least comprising a first elastic stress frame 20A and a second elastic stress frame 30A. The first elastic stress frame 20A has a linear strip shape, and has two support portions 23 that are in contact with the sound equipment 40 at both ends of the linear strip shape. The linear strip shape between the two support portions 23 is the stress deformation portion 21, and the support portions 23 protrude toward the sound equipment with respect to the stress deformation portion 21. When the two support portions 23 come into contact with the sound equipment 40, the stress deformation portion 21 as a whole is suspended. The support portions 23 of the first elastic stress frame 20A have, at lower ends thereof, contact lines (not shown in the Figures) for supporting the sound equipment 40, and the contact lines are inclined or perpendicular with respect to the extending direction of the linear strip shape of the first elastic stress frame 20A. The two contact lines between the portions 23 and the sound equipment 40 enable the first elastic stress frame 20A to be more stabilized. In FIG. 8, the second elastic stress frame 30A is an elastic stress frame provided around the sound equipment. The elastic stress frame has two support portions 33 at both ends. A stress deformation portion 31 is formed between two support portions 33. The two support portions 33 each have, on the end portion thereof, an inwardly extending hook portion 36 (only one is shown), and the first elastic stress frame 20A is connected to the second elastic stress frame 30A by connecting the stress deformation portion 21 to the stress deformation portion 31 of the second elastic stress frame 30A. The extending direction of the linear strip shape of the first elastic stress frame 20A forms a certain angle, for example, a right angle, with the extending direction of the rod portion of the second elastic stress frame 30A. In this embodiment, the stress deformation portion 21 of the first elastic stress frame 20A is located on the side where the support portions 33 of the second elastic stress frame 30A are located, and the extending direction of the support portions 23 of the first elastic stress frame 20A coincides with that of the support portions 33 of the second elastic stress frame 30A. A holding space for holding the sound equipment 40 is defined between the support portions 23 of the first elastic stress frame 20A and the inwardly extending hook portions 36 on the ends of the support portions 33 of the second elastic stress frame 30A. In use, by tightening connecting bolt to combine and fasten the first elastic stress frame 20A and the second elastic stress frame 30A against the periphery of the sound equipment so as to apply fastening pressure onto the sound equipment from different directions, the stress deformation portion 21 of the first elastic stress frame 20A and the stress deformation portion 31 of the second elastic stress frame 30A are deformed to produce a long-term stable internal stress. Here, the first elastic stress frame 20A and the second elastic stress frame 30A may use the same kind of material, and may also use different kinds of materials. The materials of the first elastic stress frame 20A and the second elastic stress frame 30A may be acrylic (also referred to as plexiglass), the chemical composition of which is polymethylmethacrylate (PMMA). Of course, other materials with similar properties, such as one or a combination of at least two selected from polyacrylic acid, poly-acrylate, polycarbonate, polystyrene, PE, PP, PET, PBT and ABS, can also be used.

Figure 9:
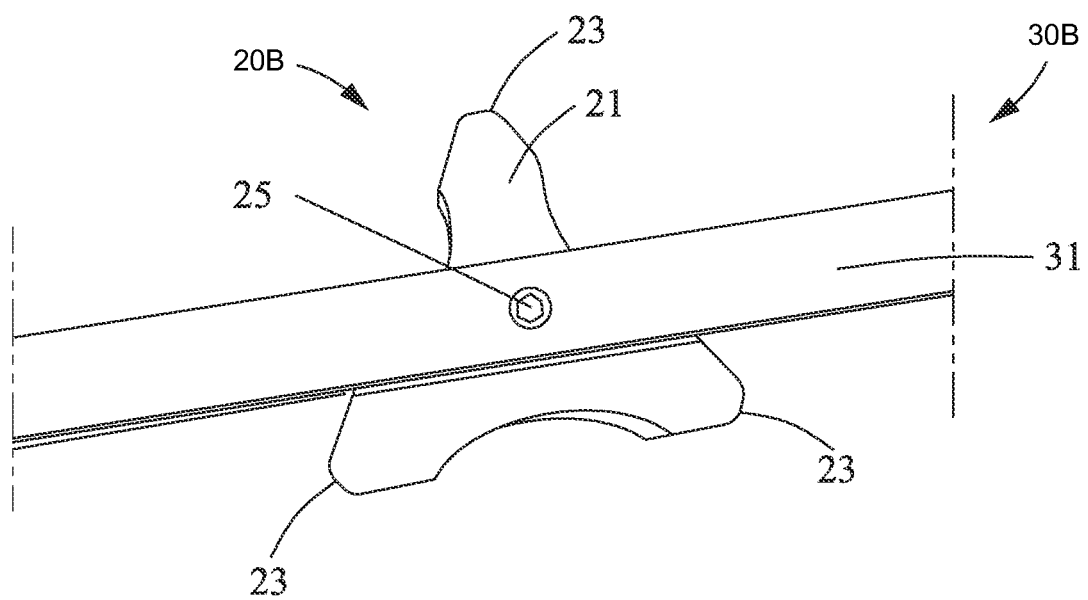
FIG. 9 shows a perspective view of a variant of the shape of a second embodiment.

FIG. 9 is a partially enlarged perspective view of a variant of the shape of a second embodiment. In this embodiment, the first elastic stress frame 20B has a solid triangular shape, and has three support portions 23 in contact with the sound equipment 40 at the radial outer end portions of each corner of the solid triangle. The solid triangular connecting portion between the three support portions 23 is the stress deformation portion 21, and the support portions 23 protrude toward the sound equipment 40 with respect to the stress deformation portion 21. When the three support portions 23 come into contact with the sound equipment 40, the stress deformation portion 21 as a whole is suspended. The contact surface between the three support portions 13 of the first elastic stress frame 20B and the sound equipment 40 is a spherical surface, and the contacts thereof are point contacts. The three point contacts between the three support portions 23 and the sound equipment 40 enable the elastic stress frame 20B to be more stabilized. In this embodiment, only a part of the second elastic stress frame 30B is shown in the figure. By means of a connection bolt 25, the center of the stress deformation portion 21 of the first elastic stress frame 20B is connected to the stress deformation portion 31 of the second elastic stress frame 30B, while the first elastic stress frame 20B and the second elastic stress frame 30B are connected together. Here, the first elastic stress frame 20B may also have other shape as described above in the present invention, such as a Y-shaped star shape, a hollow triangular shape or a four-legged bridge shape.

Figure 10:
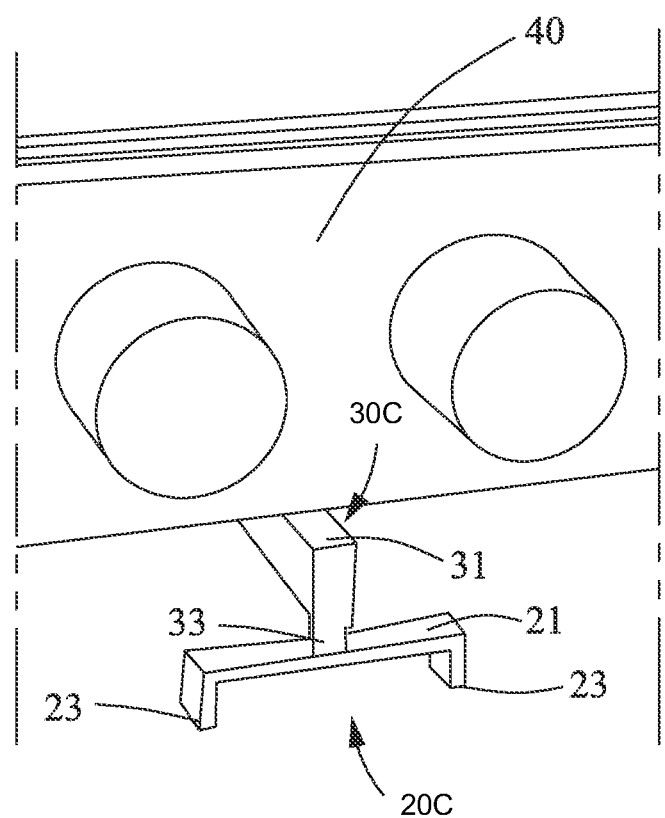
FIG. 10 shows a perspective view of a second structural variant of the second embodiment in use.

FIG. 10 is a perspective view of a second structural variant of the second embodiment in use. In FIG. 10, the anti-vibration device for the sound equipment 40 is a combined structure of a plurality of elastic stress frames, at least comprising a first elastic stress frame 20C and a second elastic stress frame 30C. The first elastic stress frame 20C has a linear strip shape, and has two support portions 23 in contact with the support surface at both ends. The linear strip shape between the two support portions 23 is the stress deformation portion 21, and the support portions 23 protrude toward the support surface with respect to the stress deformation portion 21. When the two support portions 23 are in contact with the support surface, the stress deformation portion 21 as a whole is suspended. The support portions 23 of the first elastic stress frame 20C have, on lower ends thereof, have contact lines in contact with the support surface for support, and the contact lines are inclined or perpendicular with respect to the extending direction of the linear strip shape of the first elastic stress frame 20C. The two contact lines between the support portions 23 and the support surface enable the first elastic stress frame 20C to be more stabilized. In FIG. 10, the second elastic stress frame 30C also has a linear strip shape, and is provided under the sound equipment 40. The second elastic stress frame 30C of the linear strip shape has support portions 33 at both ends, and a stress deformation portion 31 is formed between two support portions 33. The first elastic stress frame 20C is connected to the second elastic stress frame 30C by connecting the stress deformation portion 21 thereof to the support portion 33 of the second elastic stress frame 30C at the end distal away from the stress deformation portion 31 of the second elastic stress frame 30C. The extending direction of the linear strip shape of the first elastic stress frame 20C forms a certain angle, for example, a right angle, with the extending direction of the linear strip shape of the second elastic stress frame 30C. In this embodiment, the stress deformation portion 21 of the first elastic stress frame 20C is located on the side where the support portions 33 of the second elastic stress frame 30C are located, and the extending direction of the support portions 23 of the first elastic stress frame 20C coincides with that of the support portions 33 of the second elastic stress frame 30C. A support surface for supporting the sound equipment 40 is formed on the stress deformation portion 31 of the second elastic stress frame 30C. In use, the sound equipment 40 is put on the stress deformation portion 31 of the second elastic stress frame 30C, and is pressed against the combined structure of the plurality of elastic stress frames due to the weight of the sound equipment 40 itself so as to apply pressure to them, such that the stress deformation portion 21 of the first elastic stress frame 20C and the stress deformation portion 31 of the second elastic stress frame 30C are deformed and produce a long-term stable internal stress. Here, the first elastic stress frame 20C and the second elastic stress frame 30C may use the same kind of material, and may also use different kinds of materials. The materials of the first elastic stress frame 20C and the second elastic stress frame 30C may be acrylic (also referred to as plexiglass), the chemical composition of which is polymethylmethacrylate (PMMA). Of course, other materials with similar properties, such as one or a combination of at least two selected from poly-acrylic acid, polyacrylate, polycarbonate, polystyrene, PE, PP, PET, PBT and ABS, can also be used. In addition, the first elastic stress frame 20C may also have other shape as described above in the present invention, such as a Y-shaped star shape, a hollow triangular shape or a four-legged bridge shape.

Figure 11:
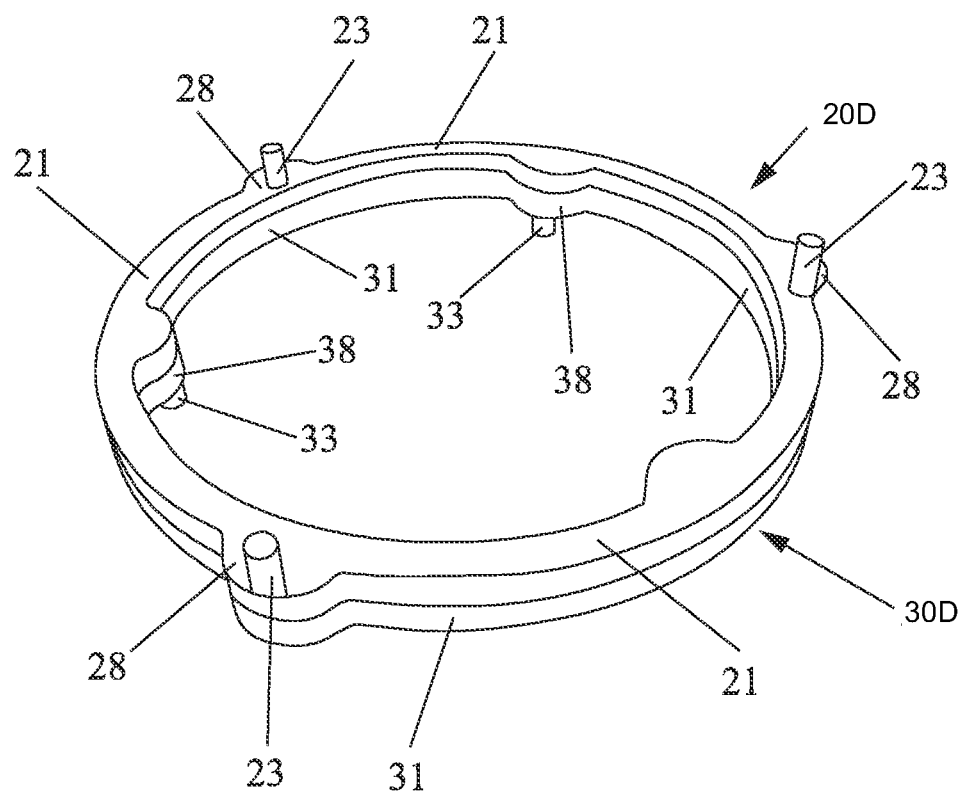
FIG. 11 shows a perspective view of a third embodiment of an anti-vibration device for sound equipment.

FIG. 11 is a perspective view of a third embodiment of an anti-vibration device for sound equipment. In FIG. 11, the anti-vibration device for the sound equipment 40 is a combined structure of a plurality of elastic stress frames, and comprises at least a first elastic stress frame 20D and a second elastic stress frame 30D. The first elastic stress frame 20D and the second elastic stress frame 30D both have a ring shape. The first elastic stress frame 20D has three support portions 23 in contact with the sound equipment 40 equidistantly distributed on the circumference of the ring shape. The three arc-shaped ring segments between the three support portions 23 are the stress deformation portions 21. The second elastic stress frame 30D has three support portions 33 in contact with the support surface equidistantly distributed on the circumference of the ring shape. The three arc-shaped ring segments between the three support portions 33 are the stress deformation portions 31. The support portions 33 of the second elastic stress frame 30D and the support portions 23 of the first elastic stress frame 20D are arranged in an alternate manner in the circumferential direction, and the support portions 23 of the first elastic stress frame 20D and the support portions 33 of the second elastic stress frame 30D protrude toward different directions away from each other. That is, the stress deformation portions 21 of the first elastic stress frame 20D are located on the opposite side of the support portions 33 of the second elastic stress frame 30D, and the stress deformation portions 31 of the second elastic stress frame 30D are located on the opposite side of the support portions 23 of the first elastic stress frame 20D. When the three support portions 23 of the first elastic stress frame 20D are in contact with the sound equipment 40 and the three support portions 33 of the second elastic stress frame 30D are in contact with the support surface, the stress deformation portions 21 of the first elastic stress frame 20D and the stress deformation portions 31 of the second elastic stress frame 30D as a whole are suspended. In FIG. 11, the stress deformation portions 21 of the first elastic stress frame 20D connected to the support portions 23 of the first elastic stress frame 20D have outer protrusions 28 which outwardly extend radially and have a width larger than the width of the ring, and the support portions 23 of the first elastic stress frame 20D are provided on the outer protrusions 28. The stress deformation portions 31 of the second elastic stress frame 30D connected to the support portions 33 of the second elastic stress frame 30D have inner protrusions 38 which inwardly extend radially and have a width larger than the width of the ring, and the support portions 33 of the second elastic stress frame 30D are provided on the inner protrusions 38. In the present embodiment, at intermediate positions between two adjacent support portions 33 on the stress deformation portions 31 of the second elastic stress frame 30D, there are outer protruding shapes corresponding to the outer protrusions 28 on the stress deformation portions 21 of the first elastic stress frame 20D. At intermediate positions between two adjacent support portions 23 on the stress deformation portions 21 of the first elastic stress frame 20D, there are inner protruding shapes corresponding to the inner protrusions 38 on the stress deformation portions 31 of the second elastic stress frame 30D. The corresponding outer protruding shapes and inner protruding shapes respectively support the outer protrusions 28 and the inner protrusions 38. In use, the first elastic stress frame 20D and the second elastic stress frame 30D are combined together and placed between the sound equipment 40 and the support surface for supporting the sound equipment 40 from below, such that the stress deformation portions 21 of the first elastic stress frame 20D and the stress deformation portions 31 of the second elastic stress frame 30D are deformed and produce a long-term stable internal stress. Here, the first elastic stress frame 20D and the second elastic stress frame 30D may use the same kind of material, and may also use different kinds of materials. The materials of the first elastic stress frame 20D and the second elastic stress frame 30D may be acrylic (also referred to as plexiglass), the chemical composition of which is polymethylmethacrylate (PMMA). Of course, other materials with similar properties, such as one or a combination of at least two selected from polyacrylic acid, poly-acrylate, polycarbonate, polystyrene, PE, PP, PET, PBT and ABS, can also be used.

Figure 12:
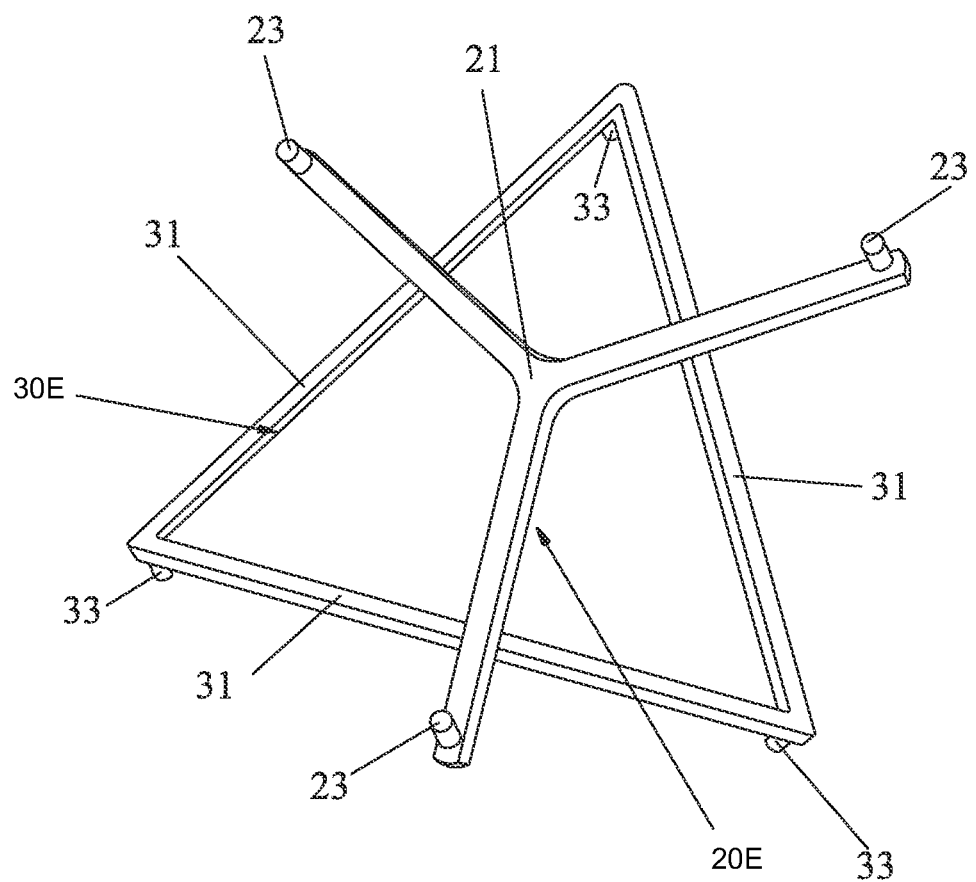
FIG. 12 shows a top view of a variant of the shape of the third embodiment.

FIG. 12 is a top view of a variant of the shape of the third embodiment. In this embodiment, the first elastic stress frame 20E has a Y-shaped star shape, and the second elastic stress frame 30E has a hollow triangular shape. Three support portions 23 in contact with the sound equipment 40 are provided on the radial outer end portion of each branch of the Y-shaped star shape of the first elastic stress frame 20E. The Y-shaped connection portion between the three support portions 23 is the stress deformation portion 21, and the support portions 23 protrude toward the sound equipment 40 with respect to the stress deformation portion 21. Three support portions 33 in contact with the support surface are provided on the corners of the hollow triangular shape of the second elastic stress frame 30E. The triangular side portions between the three support portions 33 are the stress deformation portions 31. The support portions 33 protrude toward the support surface with respect to the stress deformation portions 31. Here, the first elastic stress frame 20E and the second elastic stress frame 30E may also respectively use the above-mentioned other shapes in the present invention, for example, a Y-shaped star shape or a hollow triangular shape.

Figure 13:
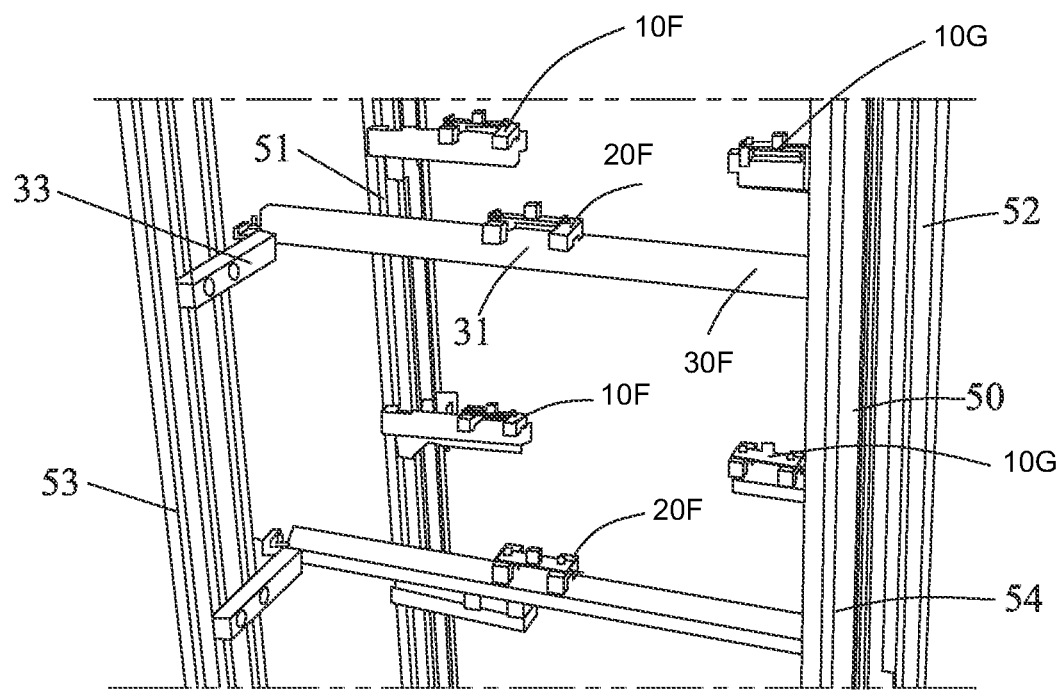
FIG. 13 shows a perspective view of a sound equipment rack with the anti-vibration device.
Figure 14:
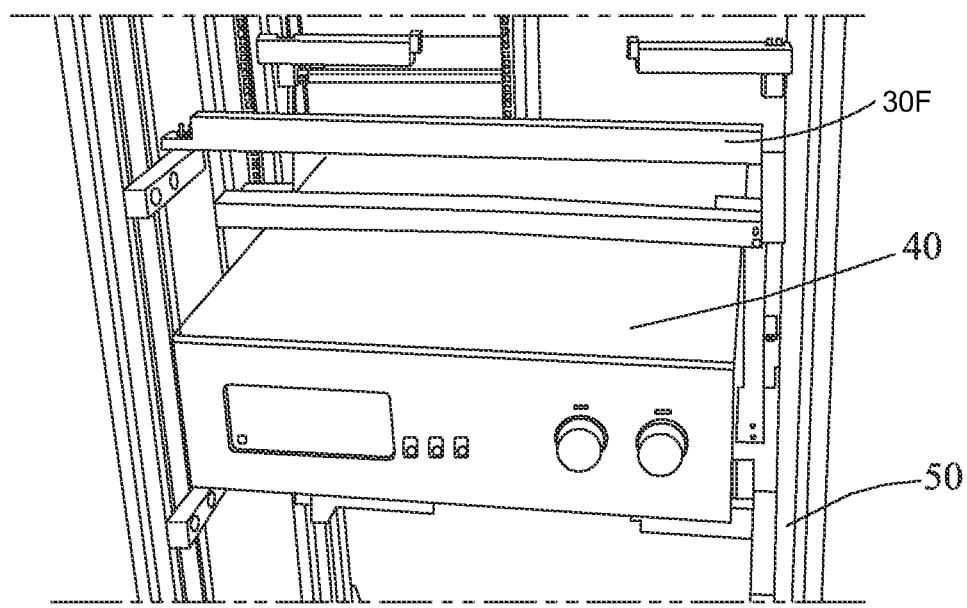
FIG. 14 is a perspective view of the sound equipment rack with the anti-vibration device in use.

FIG. 13 and FIG. 14 are perspective views of a sound equipment rack with the anti-vibration device, respectively. In FIGS. 13 and 14, the sound equipment rack has a rack body 50 on which the anti-vibration device as described above is provided. The rock body 50 comprises a first upright column 51, a second upright column 52, a third upright column 53 and a fourth upright column 54. The sound equipment rack comprises three anti-vibration devices arranged in a triangle. The first and second anti-vibration devices are anti-vibration devices comprising the elastic stress frames 10F and 10G described in the first embodiment of the present invention, and are supported by the first upright column 51 and the second upright column 52 via cantilever beams respectively. The third anti-vibration device is the anti-vibration device having the combined structure of a plurality of elastic stress frames 20F and 30F of the second embodiment of the present invention as described hereinabove. The two support portions 33 of the second elastic stress frame 30F of the third anti-vibration device are supported by the third upright column 53 and the fourth upright column 54 in a cantilevered manner. The first elastic stress frame 20F of the third anti-vibration device is provided on the middle upper side of the stress deformation portion 31 of the second elastic stress frame 30F. The stress deformation portions of the elastic stress frames of the first and second anti-vibration devices 10F and 10G and the stress deformation portion of the first elastic stress frame 20F of the third anti-vibration device collectively form a support surface for supporting the sound equipment. By adjusting the height positions of the three anti-vibration devices, the three elastic stress frames 10F, 10G and 20F for supporting the sound equipment are in the same height plane. In this embodiment, the three elastic stress frames 10F, 10G and 20F all have a four-legged bridge shape. Of course, the above-mentioned other shapes may also be adopted, for example, a linear strip shape, a Y-shaped star shape or a hollow triangular shape. Here, the three anti-vibration devices may use the same kind of material, and may also use different kinds of materials. The materials of the anti-vibration devices may be acrylic (also referred to as plexiglass), the chemical composition of which is polymethylmethacrylate (PMMA). Of course, other materials with similar properties, such as one or a combination of at least two selected from polyacrylic acid, poly-acrylate, polycarbonate, polystyrene, PE, PP, PET, PBT and ABS, can also be used.

As there are various kinds of sound equipment and their shape, size and weight characteristics are not exactly the same, the anti-vibration device will be designed and manufactured in different forms so as to match each other, with respect to sound equipment having different shapes, sizes and weights during the design and manufacturing of the anti-vibration device for the sound equipment, to meet the usage requirements of different types of sound equipment, and finally achieve the ideal effects of consonance and resonance reduction and distortion reduction.

In addition, not only the anti-vibration device for sound equipment can be provided outside the sound equipment, but also enough space can be reserved therein in the design and manufacturing of the sound equipment and a laminate plate for supporting the sound equipment. The anti-vibration device can be provided inside the sound equipment and the laminate plate for supporting the sound equipment, so that the sound equipment and the laminate plate for supporting the sound equipment appear more beautiful and are more convenient to use.

Various other components may be included and called upon for providing for aspects of the teachings herein. For example, additional materials, combinations of materials and/or omission of materials may be used to provide for added embodiments that are within the scope of the teachings herein.

A variety of modifications of the teachings herein may be realized. Generally, modifications may be designed according to the needs of a user, designer, manufacturer or other similarly interested party. The modifications may be intended to meet a particular standard of performance considered important by that party.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" and forms thereof are intended to be inclusive such that there may be additional elements other than the listed elements. As used herein, the term "exemplary" is not intended to imply a superlative example. Rather, "exemplary" refers to an embodiment that is one of many possible embodiments.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An anti-vibration device for sound equipment, characterized in that the anti-vibration device is a combined structure of a plurality of elastic stress frames configured to hold the sound equipment and reduce a consonance, a resonance, and a degree of distortion of the sound equipment, which at least comprise a first elastic stress frame and a second elastic stress frame, the first and second elastic stress frames each comprising a stress deformation portion and support portions, the support portions of the first elastic stress frame and the support portions of the second elastic stress frame protruding away from each other in opposite directions, the support portions on the second elastic stress frame and the support portion on the first elastic stress frame being arranged in an alternating manner along a circumferential direction, and further characterized in that the materials of the first elastic stress frame and the second elastic stress frame are one or a combination of at least two selected from polymethylmethacrylate, polyacrylic acid, polyacrylate, polycarbonate, polystyrene, PE, PP, PET, PBT and ABS;

characterized in that the first elastic stress frame comprises a ring shape, the number of the support portions of the first elastic stress frame is at least three, the at least three support portions of the first elastic stress frame being equidistantly distributed along the circumferential direction, and the stress deformation portion of the first elastic stress frame is formed by arc-shaped segments of the ring shape between the support portions of the first elastic stress frame;

characterized in that the second elastic stress frame is located below the first elastic stress frame, the second elastic stress frame comprises a ring shape, the number of the support portions of the second elastic stress frame is at least three, the at least three support portions of the second elastic stress frame being equidistantly distributed along the circumferential direction, and the stress deformation portion of the second elastic stress frame is formed by arc-shaped segments of the ring shape between the support portions of the second elastic stress frame; and characterized in that outer protrusions which comprise a width greater than the width of the ring shape and extend outward radially are provided at positions where the stress deformation portion of the first elastic stress frame and the support portions of the first elastic stress frame are connected, and the support portions of the first elastic stress frame are provided on the outer protrusions.

2. The anti-vibration device according to claim 1, characterized in that inner protrusions which comprise a width greater than the width of the ring shape and extend inward radially are provided at positions where the stress deformation portion of the second elastic stress frame and the support portions of the second elastic stress frame are connected, and the support portions of the second elastic stress frame are provided on the inner protrusions.

3. The anti-vibration device according to claim 2, characterized in that an intermediate position between two adjacent support portions on the stress deformation portion of the second elastic stress frame comprises an outwardly protruding shape corresponding to the outer protrusions on the stress deformation portion of the first elastic stress frame.

4. The anti-vibration device according to claim 3, characterized in that an intermediate position between two adjacent support portions on the stress deformation portion of the first elastic stress frame comprises an inwardly protruding shape corresponding to the inner protrusions on the stress deformation portion of the second elastic stress frame.

* * * * *